United States Patent
Hornberger

(10) Patent No.: US 9,296,411 B2
(45) Date of Patent: Mar. 29, 2016

(54) METHOD AND SYSTEM FOR CONTROLLING A VEHICLE TO A MOVING POINT

(71) Applicants: CNH Industrial America LLC, New Holland, PA (US); Autonomous Solutions, Inc., Mendon, UT (US)

(72) Inventor: Michael G. Hornberger, Weston, ID (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 0 days.

(21) Appl. No.: 14/468,926

(22) Filed: Aug. 26, 2014

(65) Prior Publication Data

US 2016/0059881 A1    Mar. 3, 2016

(51) Int. Cl.
*G01C 22/00*    (2006.01)
*B62D 1/28*    (2006.01)
*G05D 1/02*    (2006.01)

(52) U.S. Cl.
CPC .............. *B62D 1/283* (2013.01); *G05D 1/0295* (2013.01)

(58) Field of Classification Search
CPC .... A01B 69/008; B60W 10/04; B60W 10/18; B60W 10/20; B60W 2300/152
USPC .............. 701/22; 180/167, 168, 271; 303/177
See application file for complete search history.

(56) References Cited

U.S. PATENT DOCUMENTS

| | | | |
|---|---|---|---|
| 5,375,059 A | 12/1994 | Kyrtsos et al. | |
| 5,777,451 A | 7/1998 | Kobayashi et al. | |
| 6,101,795 A | 8/2000 | Diekhans | |
| 6,163,277 A | 12/2000 | Gehlot | |
| 6,240,346 B1 | 5/2001 | Pignato | |
| 6,370,471 B1 | 4/2002 | Lohner et al. | |
| 6,732,024 B2 | 5/2004 | Wilhelm Rekow et al. | |
| 6,760,654 B2 | 7/2004 | Beck | |
| 6,859,729 B2 | 2/2005 | Breakfield et al. | |
| 8,160,809 B2 | 4/2012 | Farwell et al. | |
| 8,229,618 B2 | 7/2012 | Tolstedt et al. | |
| 8,275,491 B2 | 9/2012 | Ferrin et al. | |
| 8,353,737 B2 | 1/2013 | Sofman et al. | |
| 8,560,157 B2* | 10/2013 | Brabec | 701/23 |
| 8,606,498 B2* | 12/2013 | Pesterev et al. | 701/400 |
| 2005/0023049 A1* | 2/2005 | Ferree | B60K 17/10 180/6.3 |

(Continued)

FOREIGN PATENT DOCUMENTS

CA    2 305 606 A1    10/2000
WO    2013/124320 A1    8/2013

OTHER PUBLICATIONS

Hattori et al., Driving Control System for an Autonomous Vehicle Using Multiple Observed Point Information, 1992, IEEE, p. 207-212.*

(Continued)

*Primary Examiner* — McDieunel Marc

(74) *Attorney, Agent, or Firm* — Rebecca L. Henkel

(57) ABSTRACT

An autonomous vehicle including a chassis, a conveyance system carrying the chassis, and a controller configured to steer the conveyance system. The controller is further configured to execute the steps of receiving steering radius information from a source; and creating steering instructions for the vehicle dependent upon the steering radius information from the source. The source not being from the vehicle itself.

18 Claims, 4 Drawing Sheets

(56) References Cited

U.S. PATENT DOCUMENTS

| | | | |
|---|---|---|---|
| 2005/0218718 A1* | 10/2005 | Iwatsuki et al. | 303/177 |
| 2008/0059007 A1 | 3/2008 | Whittaker et al. | |
| 2008/0097666 A1* | 4/2008 | Oba et al. | 701/41 |
| 2008/0208454 A1* | 8/2008 | Pesterev et al. | 701/206 |
| 2009/0076673 A1* | 3/2009 | Brabec | 701/23 |
| 2009/0276111 A1* | 11/2009 | Wang | B60T 8/17551 701/23 |
| 2013/0052614 A1* | 2/2013 | Mollicone | G09B 19/167 434/65 |
| 2013/0144465 A1 | 6/2013 | Shida | |
| 2015/0035981 A1* | 2/2015 | Otsuki et al. | 348/148 |

OTHER PUBLICATIONS

"Vehicle Platoon Control With Multi-Configuration Ability", ScienceDirect, International Conference on Computational Science, ICCS 2012, El-Zaher et al. (10 pages).

* cited by examiner

METHOD AND SYSTEM FOR CONTROLLING A VEHICLE TO A MOVING POINT

BACKGROUND OF THE INVENTION

1. Field of the Invention

The present invention relates to vehicles, and, more particularly, to vehicles which are controlled using a guidance control system.

2. Description of the Related Art

Vehicle leader-follower systems are used in various military and transportation applications in which one vehicle, called the "leader", moves along the ground, in the air, or through space, and one or more other vehicles, each called a "follower", follow the leader and/or move along a path that is displaced from the path taken by the leader.

A leader-follower system approach can have constraints in which the follower is too slow to adequately respond to changes in speed and bearing of the leader. The follower must first observe or be communicated the change in speed and bearing of the leader before providing inputs to its controls to adjust its own trajectory in order to stay at the proper offset distance from the leader. Thus, there is an inherent delay between the leader changing its speed and/or bearing and the follower changing its speed and/or bearing. This inherent delay causes poor performance in maintaining the same path as the leader and the proper follow distance unless the follow distance is great enough to allow for the sensing and communications delay time.

In some applications autonomous vehicle convoys, utilize a common route planning among vehicles in the convoy for maintaining a formation among the vehicles of the convoy. The convoy consists of a leader vehicle and follower vehicles which receive a guidance signal from the vehicle ahead of it for maintaining a path of travel. Such systems may utilize a sensing system to maintain a safe distance with the vehicle ahead. Each member vehicle of the convoy knows the route and destination in advance, and the location along the route at any given point in time.

Vehicles, such as those used in the agricultural, forestry and construction industries are typically controlled by an operator sitting at an operator station. However, it is also becoming more common for such vehicles to be controlled automatically through the use of a vehicle guidance system. Often an operator remains at the operator station so that control of the vehicle can be overtaken manually should the need arise. The operator typically drives the work vehicle to a predefined area, such as an agricultural field, then actuates the guidance system so that the work vehicle can be automatically driven in a predefined path through the field. The operator also manually attaches any tools (e.g., implements), and loads any application materials (such as fertilizer, herbicides, etc.). Regardless of the application, the operator is always present and ultimately under final (over-ride) control of the work vehicle.

For semi-autonomous systems, it is also known to provide various geospatial data to the controller onboard the vehicle such that the position of the vehicle within a geospatial framework can be determined within certain tolerances. For example, in the case of an agricultural sprayer, it is known to utilize global positioning system (GPS) data to turn on and off different sprayer boom sections as the sprayer traverses across a field.

The future outlook for off-highway agricultural and construction equipment shows an increased use of automated and unmanned technologies to increase the efficiency of operations with these vehicles. Some off-highway agricultural and construction activities demand precise and reliable vehicle control of one vehicle to a fixed offset from and close proximity to a second vehicle. Human operators with the necessary skill set are costly and sometimes unfeasible. Fatigue and stress in humans also contribute to human error which can result in costly equipment repairs and down time.

What is needed in the art is a control system that allows precise, reliable, and repeatable vehicle control beyond the skills of a human operator.

SUMMARY OF THE INVENTION

The present invention is directed to a vehicle control system in the form of a control that utilizes steering radius information. The present invention being disclosed is a method and system for controlling an autonomous vehicle's velocity and steer curvature such that the vehicle remains positioned on a moving target point. This allows an autonomous vehicle to maintain its position relative to some other body in motion. The body could be a second vehicle (manned or unmanned), a hand-held tracking device, a simulation, or other arbitrarily generated series of positions.

The present invention consists in one form thereof of an autonomous vehicle including a chassis, a conveyance system carrying the chassis, and a controller configured to steer the conveyance system. The controller is further configured to execute the steps of receiving steering radius information from a source; and creating steering instructions for the vehicle dependent upon the steering radius information from the source. The source not being from the vehicle itself.

The present invention consists in another form thereof of a method of controlling movements of a vehicle including the steps of receiving steering radius information from a source; and creating steering instructions for the vehicle dependent upon the steering radius information from the source. The source not being from the vehicle itself.

An advantage of the present invention is that it provides for the positioning of the follower vehicle at an offset from a leader vehicle.

Another advantage of the present invention is that the use of a steering radius compensates for the needed velocity changes to maintain a fixed position relative to the leader vehicle.

Yet another advantage of the present invention is that the leader vehicle movements can all be virtual.

Yet another advantage of the present invention is that the follower can act as a leader for another vehicle.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

Figure 1:
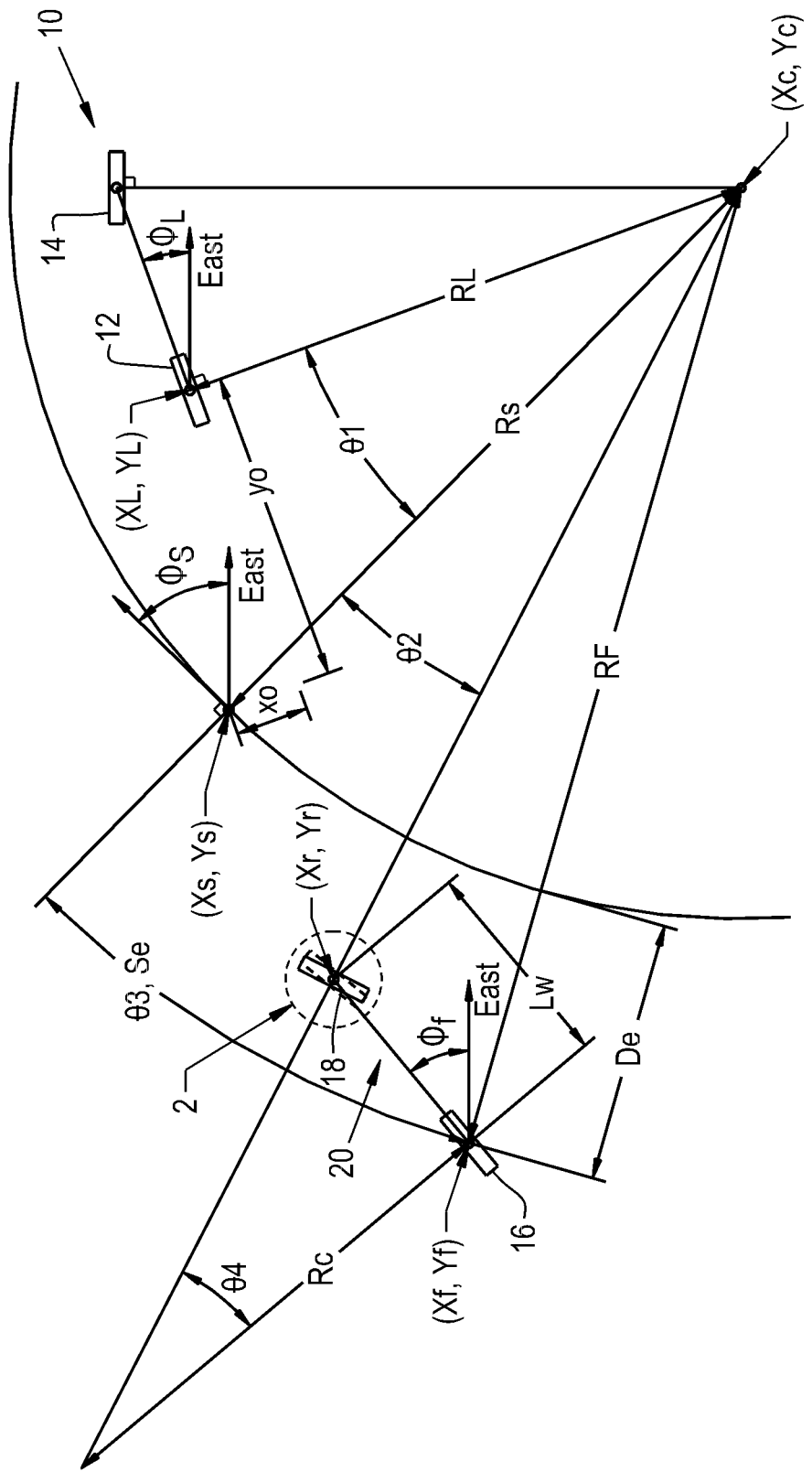
FIG. 1 is a schematic top view of an embodiment of an autonomous vehicle using a control method of the present invention.
Figure 2:
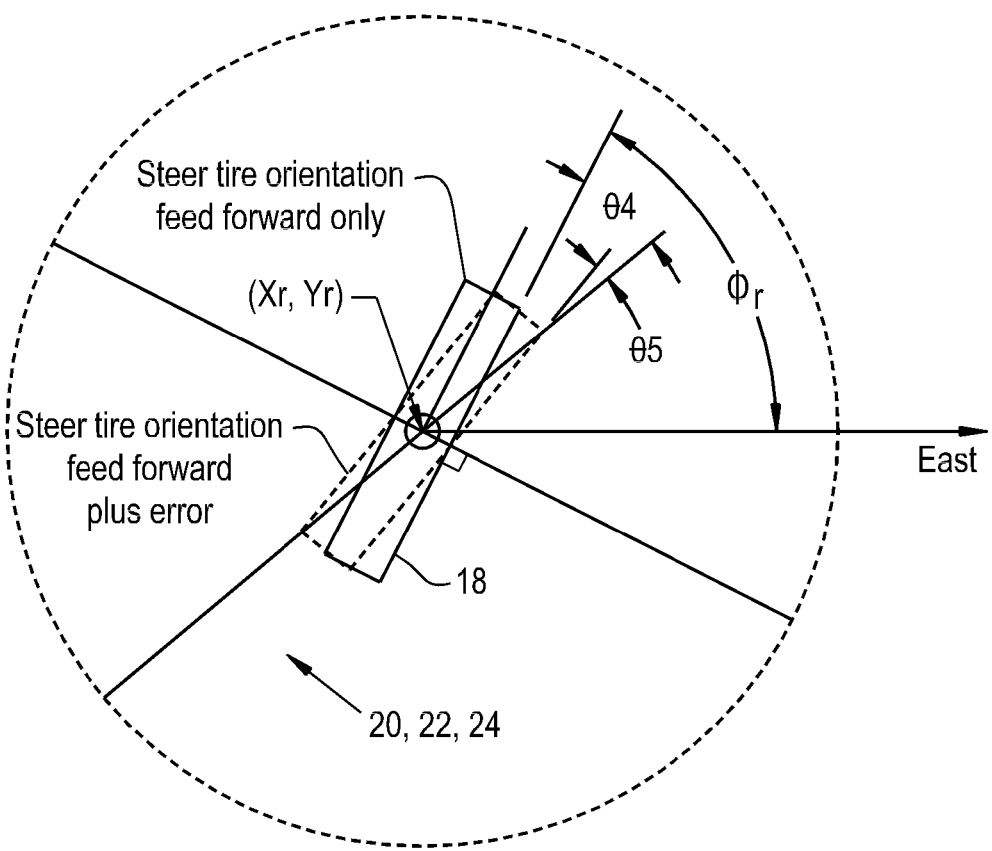
FIG. 2 is a closer schematical top view of the vehicle of FIG. 1.

Referring now to the drawings, and more particularly to FIGS. 1 and 2, there is shown a vehicle 10 with a rear wheel 12 and a steerable wheel 14. Although only two wheels are shown and discussed for vehicle 10, it is understood that multiple wheels and/or track assemblies can be used and that more than one wheel can be steered, the references to a single wheel are intended to be extended to multiple conveyances of the vehicle. In a similar manner a rear wheel 16 and a steerable wheel 18 are part of a vehicle 20. Vehicle 20 includes a chassis 22 and a controller 24. Wheels 16 and 18 together (or even singularly) can be construed to be a conveyance system for chassis 22 and of course vehicle 20.

The present invention assumes that at least vehicle 20 has been equipped with the necessary systems to perform autonomous functions that conform with established operational and safety standards for such vehicles. A means of generating the position, velocity, heading, and curvature (steer radius) data of the target point of vehicle 10 is also present. This data could be derived from information about lead vehicle 10, such as position, velocity, heading, steer radius along with a fixed or adjustable target position offset for vehicle 20 from that of lead vehicle 10.

Though the target point tracked by a follower vehicle 20 could be generated from many sources, the explanation in one embodiment of the present invention assumes a situation where the follower vehicle maintains a constant position relative to a leader vehicle 10. This invention assumes that:

The follower vehicle 20 has been equipped with a system that enables autonomous control of vehicle functions including velocity (propulsion) and steering of the vehicle.
  The follower vehicle 20 has been equipped with a system which provides follower vehicle X,Y position, and heading.
  The follower vehicle 20 has been equipped with a communication system which receives leader vehicle 10 X,Y position, velocity, heading, and steer radius.
  The leader vehicle 10 has been equipped with a system which provides leader vehicle X,Y position, velocity, heading, and steer radius.
  The leader vehicle 10 has been equipped with a communication system which sends leader vehicle X,Y position, velocity, heading, and steer radius to follower vehicle 20.
  Optionally, the follower vehicle 20 may also receive periodic updates of the desired target point offset relative to the leader vehicle's position and orientation. This offset data could originate from a variety of sources including, leader vehicle 10, human interface, fixed constants, etc.

Figure 3A:
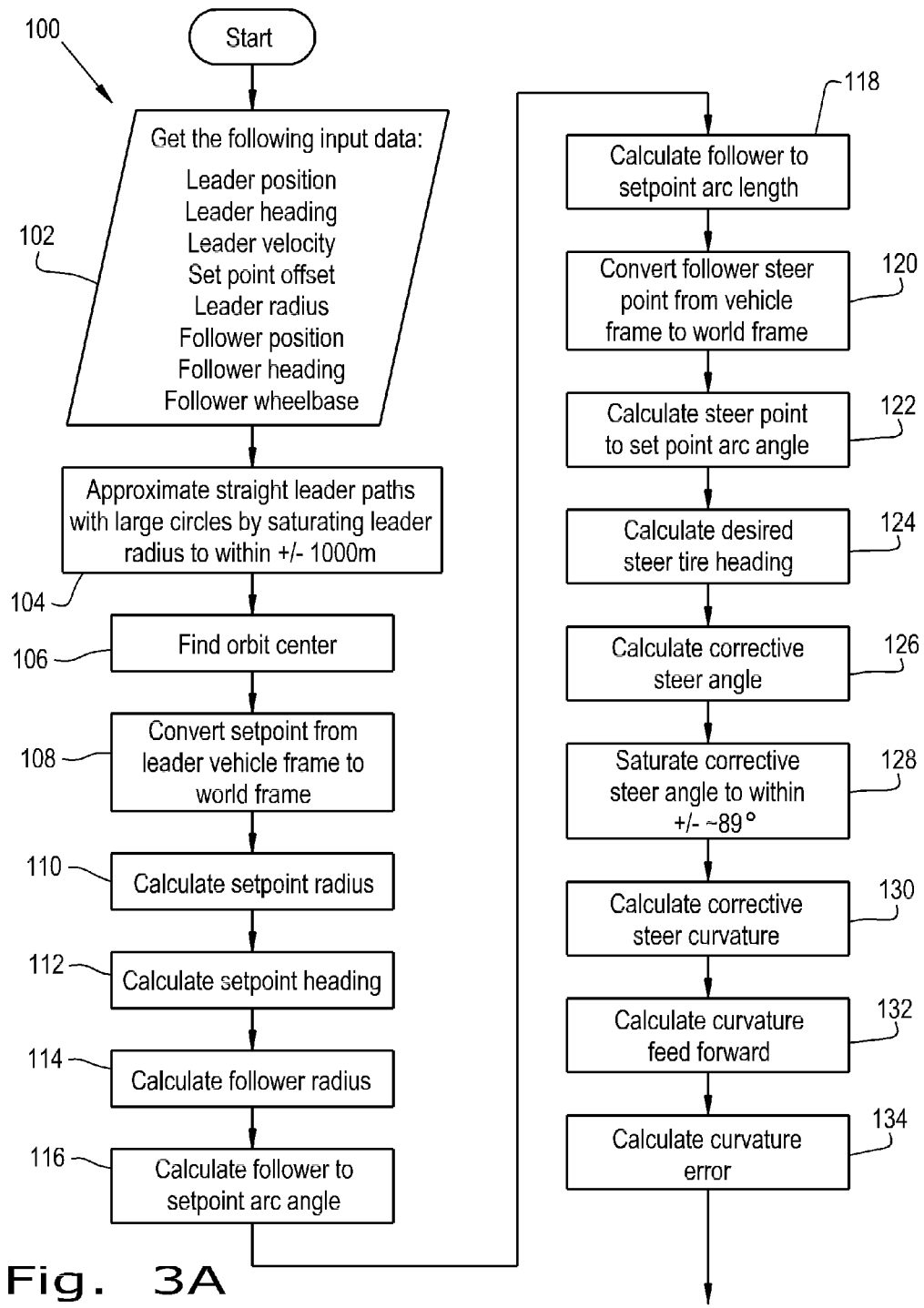
FIG. 3A is a part of a flowchart that details steps of the method to control the movement of the vehicle shown in FIGS. 1 and 2.
Figure 3B:
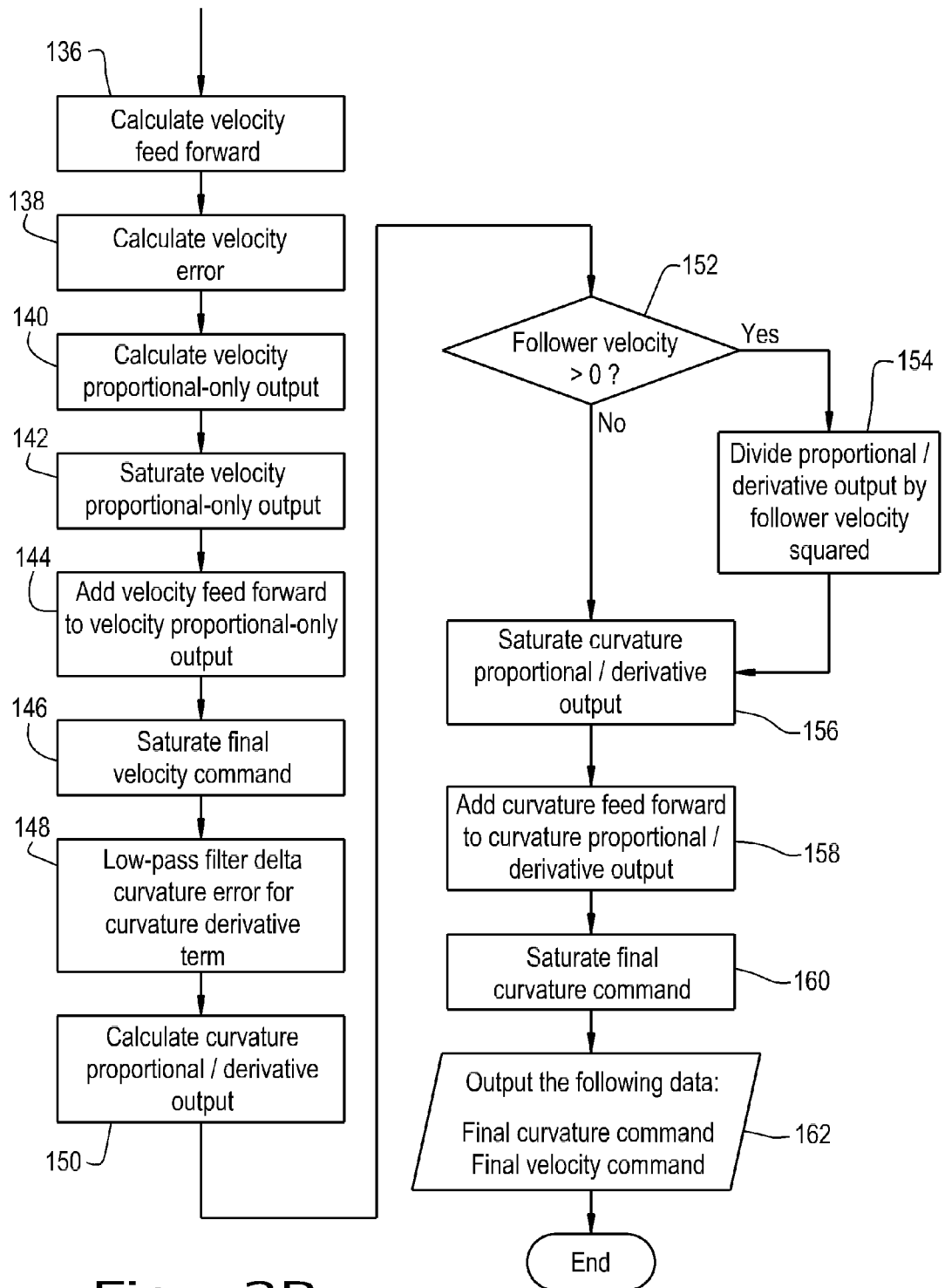
FIG. 3B is a continuation of the flowchart started on FIG. 3A.

From all of this input data, the follower vehicle 20 calculates and autonomously effects an output steer radius and velocity that causes it to remain at the desired offset relative to the moving leader vehicle. FIGS. 1 and 2 illustrate the geometry and FIGS. 3A and 3B provide a flowchart of the method of the invention along with the following Symbol Definitions and Equations to describe how the output steer radius and velocity are calculated. The leader and follower vehicles 10 and 20 are represented in the geometry diagrams of FIGS. 1 and 2 as bicycles for illustrative simplicity.

Note: In the following, the terms "curvature" and "steer radius" may be used interchangeably and have the following relationship to each other:

$$\text{curvature} = \frac{1}{\text{steer radius}}$$

$$\text{steer radius} = \frac{1}{\text{curvature}}$$

Symbol Definitions
(Xl,Yl)=Leader position
$\Phi l$=Leader heading angle
$(x_o,y_o)$=Setpoint offset from leader
$\theta 1$=Leader position to setpoint arc angle
Rl=Leader radius
(Xc,Yc)=Orbit center
(Xs,Ys)=Setpoint position
$\Phi s$=Setpoint heading angle
Rs=Setpoint radius
(Xf,Yf)=Follower position
$\Phi f$=Follower heading angle
Lw=Follower wheelbase length (distance between front and rear axles)
$\theta 2$=Follower steer point to setpoint arc angle
Rf=Follower radius
$\theta 3$=Follower to setpoint arc angle
Se=Follower to setpoint arc length (velocity error)
(Xr,Yr)=Follower steer point
$\Phi r$=Follower desired steer tire heading angle
$\theta 4$=Follower corrective steer angle
Rc=Follower corrective steer radius
De=Delta radius (curvature error)
$\theta 5$=Follower final steer angle command (assuming P-term is saturated at ±0.08)
Vl=Leader velocity
Vf=Follower velocity
$\theta_{max}$=Maximum left/right steer angle of the follower (positive value, less than $\pi/2$)
$R_{max}$=Maximum left/right radius with which to approximate leader straights (positive value)
FFc=Curvature feed forward
FFv=Velocity feed forward
GPc=Curvature controller proportional gain
GDc=Curvature controller derivative gain
$Cc_{min}$=Minimum curvature controller PD term
$Cc_{max}$=Maximum curvature controller PD term
Nc=Curvature error low-pass filter coefficient
$De_f$=Filtered curvature error
Cc=Curvature controller PD term
$Oc_{min}$=Minimum final curvature output
$Oc_{max}$=Maximum final curvature output
Oc=Curvature final output
GPv=Velocity controller proportional gain
$Cv_{min}$=Minimum velocity controller P term
$Cv_{max}$=Maximum velocity controller P term
Cv=Velocity controller P term
$Ov_{min}$=Minimum final velocity output
$Ov_{max}$=Maximum final velocity output
Ov=Velocity final output
Equations:
Approximate straight leader curvature with large radius curves:

$$-R_{max} \leq Rl \leq R_{max}$$

Translate leader position to orbit center:

$$Xc = Xl + Rl\cos(\Phi l + \pi/2)$$

$$Yc = Yl + Rl\sin(\Phi l + \pi/2)$$

Convert setpoint offsets in vehicle frame to world frame and find setpoint radius:

$$Xs = Xl + (x_o\cos(\Phi l) - y_o\sin(\Phi l))$$

$$Ys = Yl + (x_o\sin(\Phi l) + y_o\cos(\Phi l))$$

$$Rs = \text{sgn}(Rl)\sqrt{(Xc-Xs)^2 + (Yc-Ys)^2}$$

Find setpoint heading:

$$\theta 1 = -\pi \leq a\tan 2(Ys-Yc, Xs-Xc) - a\tan 2(Yl-Yc, Xl-Xc) \leq \pi$$

$$\Phi s = \Phi l + \theta 1$$

Find follower radius and error terms:

$$Rf = \text{sgn}(Rl)\sqrt{(Xc-Xf)^2 + (Yc-Yf)^2}$$

$$\theta 3 = -\pi \leq a\tan 2(Ys-Yc, Xs-Xc) - a\tan 2(Yf-Yc, Xf-Xc) \leq \pi$$

$$Se = \theta 3 Rf$$

$$De = Rs - Rf$$

Translate follower position to steer point:

$$Xr = Xf + Lw\cos(\Phi f)$$

$$Yr = Yf + Lw\sin(\Phi f)$$

Steer point to setpoint arc angle:

$$\theta 3 = -\pi \leq a\tan 2(Ys-Yc, Xs-Xc) - a\tan 2(Yr-Yc, Xr-Xc) \leq \pi$$

$$\Phi r = -\pi \leq \Phi s - \theta 2 \leq \pi$$

$$\theta 4 = -\theta_{max} \leq (\Phi r - \Phi f) \leq \theta_{max}$$

$$Rc = \frac{Lw}{\tan(\theta 4)}$$

Calculate feed forward terms:

$$FFc = -\frac{1}{Rc}$$

$$FFv = \frac{VlRf}{Rc}$$

Calculate final curvature output:

$$De_f = \left[\frac{De_t - De_{t-1}}{t - t_{t-i}}\right](1 - Nc) + De_{t-1}Nc$$

$$Cc = Cc_{min} \leq \frac{DeGPc + De_f GDc}{Vf^2} \leq Cc_{max}$$

$$Oc = Oc_{min} \leq Cc + FFc \leq Oc_{max}$$

Calculate final velocity output:

$$Cv = Cv_{min} \leq SeGPv \leq Cv_{max}$$

$$Ov = Ov_{min} \leq Cv + FFv \leq Ov_{max}$$

Now, looking to a method 100 illustrated in the flowchart of FIGS. 3A and 3B, where method 100 illustrates how vehicle 20 calculates a steering angle based on a steering radius of a leader vehicle or on data that is provided to vehicle 20 that is representative of a steering radius of a projected point. Method 100 shows the flow of the application of the equations presented above. Starting at step 102 initial data on the positon, heading, velocity, offset, and radius of vehicle 10, and the positon, heading and wheelbase of vehicle 20 is obtained. At step 104, the pathway of vehicle 10 is approximated with a radius, and the orbit center of the radius is determined at step 106. At step 108, the setpoint of vehicle 10 is translated to a world frame, with the radius and heading of the setpoint being calculated in steps 110 and 112.

At step 114 a radius for vehicle 20 is calculated, and the setpoint arc angle and the arc length are calculated in steps 116 and 118. The steer point is converted from the vehicle frame to a world frame at step 120. At step 122, the steer point to setpoint arc angle is calculated and then the heading of steer tire 18 is calculated at step 124. At step 126, the corrective steer angle of tire 18 is calculated, and then a corrective steering angle is calculated then saturated to be within a predetermined range, such as ±89°, in steps 126 and 128.

At steps 130, 132 and 134, the corrective steer curvature, the curvature feed forward and curvature error are calculated. At steps 136, 138 and 140, the velocity feed forward, the velocity error, and the velocity proportional-only output are calculated. A saturation of the velocity proportional only output takes place at step 142. The velocity feed forward is added to the velocity proportional-only output at step 144, with the result being saturated at step 146. At step 148, the delta curvature error is run through a low-pass filter to obtain a curvature derivative term. The curvature proportional/derivative output is calculated at step 150.

At step 152 it is determined if the velocity of vehicle 20 is greater than zero, and if it is method 100 proceeds to step 154, but if the velocity is not greater than zero then method 100 bypasses step 154 and proceeds to step 156. At step 154, the curvature proportional/derivative output is divided by the velocity of vehicle 20 squared. In step 156, the curvature proportional/derivative output is saturated. The curvature feed forward term is added to the curvature proportional/derivative output at step 158. The final curvature command is saturated at step 160. The final curvature command and velocity command are output from method 100 at step 162. Method 100 is then repeated, without obtaining the initial information of step 102, to continuously operate and control the movement of vehicle 20.

Advantageously the present invention describes a follower vehicle 20 that remains fixed to a constant position offset from a leader vehicle 10. It is contemplated that the control point (point that the follower tries to fix itself to), could originate from simulation or a preplanned path. It is also contemplated that the control point could originate from a human rather than a vehicle, thus allowing vehicle control from outside the vehicle 20. It is further contemplated that the follower vehicle 20 could also act as a leader vehicle for another follower vehicle, thus allowing several vehicles to be virtually linked together (such as multiple combines harvesting in a coordinated sequence).

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An autonomous vehicle, comprising:
a chassis;
a conveyance system carrying said chassis; and
a controller configured to steer said conveyance system, said controller being further configured to execute the steps of:
receiving steering radius information from a source; and
creating steering instructions for the vehicle dependent upon said steering radius information from said source, said source not being from the vehicle, the creating step including approximating a leader radius with large radius curves.

2. The autonomous vehicle of claim 1, wherein said controller is further configured to receive positional and velocity information from said source and use said positional and velocity information in said creating step.

3. The autonomous vehicle of claim 2, wherein said creating step includes a step of calculating a curvature output to be used in creating said steering instructions.

4. The autonomous vehicle of claim 3, wherein said creating step additionally includes a step of calculating a feed forward term to be used in said calculating a curvature output step.

5. The autonomous vehicle of claim 4, wherein said creating step additionally includes a step of calculating a steer point to setpoint arc angle to be used in said calculating a feed forward term step.

6. The autonomous vehicle of claim 5, wherein said creating step additionally includes a step of translating a follower position to the steer point that is used in said calculating a steer point to a setpoint arc angle step.

7. The autonomous vehicle of claim 6, wherein said creating step additionally includes a step of finding follower radius and error terms to be used in said calculating a curvature output step.

8. The autonomous vehicle of claim 1, wherein said creating step additionally includes a step of translating the leader radius into an orbit center.

9. The autonomous vehicle of claim 8, wherein said creating step additionally includes the steps of:
converting setpoint offsets in a vehicle frame to a world frame; and
finding a setpoint radius.

10. A method of controlling movements of a vehicle, the method comprising the steps of:
receiving steering radius information from a source;
creating steering instructions for the vehicle dependent upon said steering radius information from said source, said source not being from the vehicle, said creating step additionally includes a step of approximating a leader radius with large radius curves; and
steering the vehicle using the steering instructions.

11. The method of claim 10, further comprising the step of receiving positional and velocity information from said source and using said positional and velocity information in said creating step.

12. The method of claim 11, wherein said creating step includes a step of calculating a curvature output to be used in creating said steering instructions.

13. The method of claim 12, wherein said creating step additionally includes a step of calculating a feed forward term to be used in said calculating a curvature output step.

14. The method of claim 13, wherein said creating step additionally includes a step of calculating a steer point to setpoint arc angle to be used in said calculating a feed forward term step.

15. The method of claim 14, wherein said creating step additionally includes a step of translating a follower position to the steer point that is used in said calculating a steer point to a setpoint arc angle step.

16. The method of claim 15, wherein said creating step additionally includes a step of finding follower radius and error terms to be used in said calculating a curvature output step.

17. The method of claim 10, wherein said creating step additionally includes a step of translating the leader radius into an orbit center.

18. The method of claim 17, wherein said creating step additionally includes the steps of: converting setpoint offsets in a vehicle frame to a world frame; and finding a setpoint radius.

* * * * *